March 31, 1964    C. H. CUTHBERT ET AL    3,127,249
PROCESS FOR DRYING PEBBLED AMMONIUM NITRATE
Filed Nov. 17, 1961
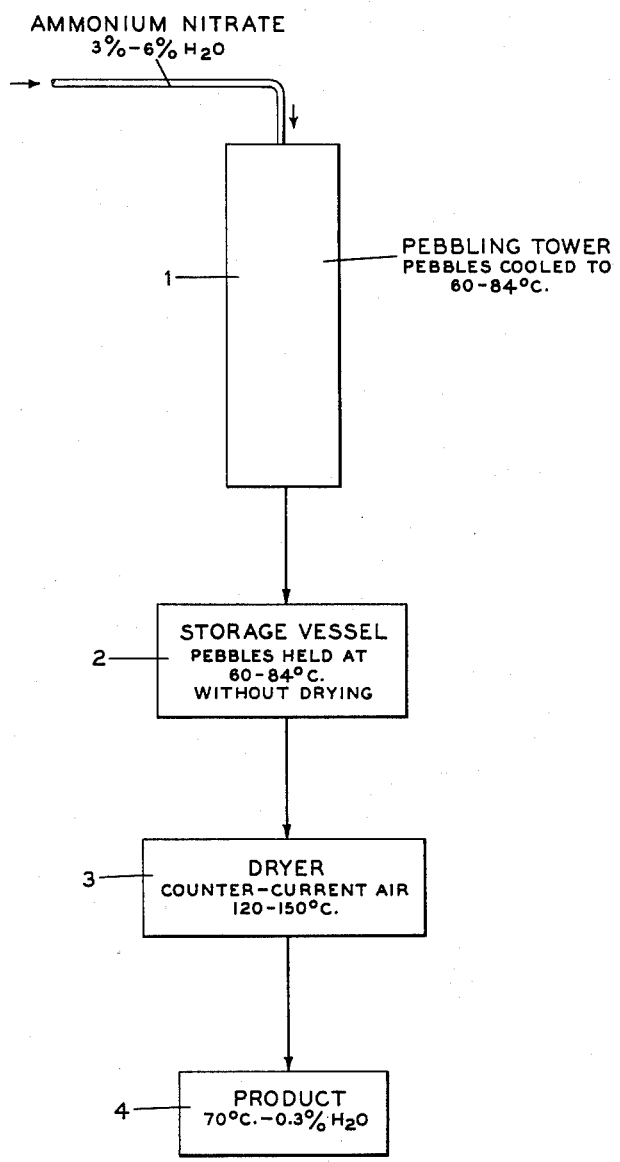
INVENTORS:
CHARLES H. CUTHBERT
WERLIE R. WRIGHT, JR.
BY
Elizabeth Hunter
ATTORNEY 3,127,249
PROCESS FOR DRYING PEBBLED
AMMONIUM NITRATE
Charles H. Cuthbert, Petersburg, and Werlie R. Wright, Jr., Chester, Va., assignors to Allied Chemical Corporation, New York, N.Y., a corporation of New York
Filed Nov. 17, 1961, Ser. No. 153,126
3 Claims. (Cl. 23—302)

This invention relates to an improved process for drying pebbled ammonium nitrate wherein economies in equipment and operating costs are realized.

Ammonium nitrate, in substantially anhydrous form, is widely used as a fertilizer and in the manufacture of explosives.

It is common practice to produce ammonium nitrate by reacting nitric acid (usually 55% to 58% concentration) with vaporized ammonia thus producing ammonium nitrate solutions of 70% to 83% by weight. This ammonium nitrate is concentrated to about 95%, and is pumped in molten form at temperature, for example, of 135°–155° C. to the top of a pebbling tower where it is sprayed, or shotted into a pebbling tower countercurrent to a stream of air. The small spherical particles or pebbles thus formed solidify on passing through the current of air. In normal prior art practice, the pebbles are then dried and cooled to bagging temperature in a series of stages, first being partially dried with air, heated or unheated, in a primary drier, second, further drying with heated air in a second drier, and third, subjecting the pebbles to additional drying and cooling in a cooler.

The above prior art methods have the disadvantages of entailing heavy capital cost for the multiple drying and cooling equipment, for requiring high energy costs for the circulation, heating and cooling of large quantities of hot and cold drying gases and of consuming long "in-process" times in the plant.

A primary object of the present invention is to provide a process for producing pebbled ammonium nitrate wherein equipment and energy costs are minimized and overall in-process time is reduced.

A further object of the invention is to reduce the number of treating stages required for drying and cooling pebbled ammonium nitrate.

A still further object of the invention is to substitute an inexpensive holding step for one of the expensive drying stages customarily employed in the drying of pebbed ammonium nitrate, and to eliminate the customary final cooling step.

These and other objects are accomplished according to our invention wherein molten ammonium nitrate containing between about 3% and about 6% water by weight, is sprayed into the top of an elongated vertical pebbling tower, thereby forming droplets, cooling the resulting droplets to solid pebbles in an ascending stream of inert gas rising through the tower, then maintaining the pebbles at a temperature below 84.2° C., preferably between about 60° C. and about 84° C. under non-drying conditions for a period sufficient to transform substantially all the ammonium nitrate to crystalline form III, preferably between about 20 minutes and about 120 minutes, and thereafter subjecting the pebbles to a flow of inert drying gas at temperatures between about 120° C. and about 150° C. for a period of not more than about 60 minutes whereby a pebbled ammonium nitrate product is obtained having a temperature not higher than about 70° C. and having a water content of not more than about 0.3%.

The accompanying drawing represents a flow sheet illustrating the progression of the ammonium nitrate pebbles through the several stages of our process and indicates at 1, an ammonium nitrate pebbling tower, at 2 a storage vessel in which the pebbles are held at 60–84° C. without drying, and at 3 the drier in which the pebbles are dried by countercurrent air at 120°–150° C. At 4 is shown the product which emerges from the single drying stage at not more than 70° C. and about 0.3% water.

In carrying out the process of our invention, molten ammonium nitrate of between about 94% and about 97% concentration by weight, the balance of 3% to 6% being water and having a temperature in the range between about 135° C. and about 155° C. is sprayed, preferably after neutralization to a pH of 5 with ammonia, into the top of the pebbling tower countercurrent to an ascending current of cool inert gas such as air, for example, entering at 10° to 30° C., wherein droplets are first formed, and the droplets are then converted into solid pebbles by cooling. The cooling of the pebbles in the pebbling tower is carried to a temperature below 84.2° C., preferably to between about 60° C. and about 84° C., such cooling being regulated by the height of the tower, the flow of cooling gas to the tower, the temperature of the cooling gas, etc. Very little, if any, drying takes place in the pebbling tower, the pebbles usually incurring not substantially more than about a 0.5% moisture drop in this stage, and thus containing between about 2.5% and about 5% water as recovered from the bottom of the pebbling tower.

The pebbled amonium nitrate from the pebbling tower, at a temperature of 60°–84° C. and with a water content of between about 2.5% and about 5% is led to a storage vessel so constructed as to inhibit substantial air circulation within the stored mass of pebbles. Ordinary metal drums are suitable for the purpose but preferably a rotating cylinder is used with partial closures at each end to provide the desired fillage, and which may be otherwise open at both ends, and preferably provided with showering flights to prevent sticking of the pebbles. No drying gas of any kind is passed into or through the storage vessel and air circulation is avoided. The pebbles are retained in the storage vessel for the required period, to convert substantially all the ammonium nitrate to crystalline form III, usually between about 20 minutes and about 120 minutes at the critical temperatures indicated.

It is important that the pebbles from the pebbling tower be held for the requisite period under substantially non-drying conditions such that substantially no loss of moisture from the pebbles takes place. This condition is readily accomplished by any normal storage conditions which tend to inhibit or restrict air circulation within the mass of pebbles or any expedients which avoid forced air circulation therein. Under such conditions partial pressures of water within the mass usually remain at values between about 65 and about 120 mm. Hg during the storage or holding period.

The temperature during the holding period should be below 84.2° C., i.e. in the temperature range within which form III ammonium nitrate is stable. While this range extends down to 32° C., we prefer to maintain temperatures in the upper portion of this range, for example, between about 60° C. and about 84° C., so as to preserve as much heat in the pebbles as possible to aid in the subsequent drying step.

The stored pebbles, now substantially all converted to form III ammonium nitrate are discharged to a drier, such as a conventional rotary drier where they are contacted with a countercurrent flow of inert gas such as air entering at a temperature in the range between about 120° C. and about 150° C. In this drier, the pebbles quickly lose their moisture content, dropping to the desired 0.3 percent in a relatively short time, usually in about 20 minutes to about 60 minutes. Due to the rapid evaporation of moisture, the pebble temperature is lowered so that the essentially dried material emerges from the drier at a temperature not higher than about 70° C., which is low enough so that it is unnecessary to provide further cooling of the pebbles, before bagging. The pebbles are then screened and bagged.

The process of our invention has a number of important advantages over conventional methods of drying ammonium nitrate. Of primary importance is the fact that only a single drying stage is required and the conventional final cooling stage is eliminated altogether. The preliminary holding or storage stage can be carried out in conventional rotary cylinders, which can be filled closer to capacity (up to 30%) than when rotary heaters and coolers are used, which normally are filled only to about 10%–12% to permit circulation of drying gas, and thus reduce total in-process time to this extent. Furthermore, energy required to heat and/or cool the air and to circulate it in the eliminated stages is saved. The drying time is appreciably shortened, usually requiring only about 20 to 60 minutes whereas conventional drying methods often require two to four hours, thus further reducing in-process time over that required by prior art processes.

The reason for the effectiveness of the holding stage in promoting subsequent drying of the pebbles is not entirely understood. It is believed, however, that this holding period provides the necessary time for the ammonium nitrate in the pebbles to convert from form II to form III stable at these temperatures. It is believed that when time is allowed for substantially complete conversion of the ammonium nitrate to form III, voids are provided which allow easy migration of the water from the interior to the surface of the pellet, and case hardening of the surface, therefore, does not occur when severe drying conditions are subsequently imposed, whereas if sufficient holding time for rearrangement is not provided, it is necessary to use a pre-drying stage providing very mild drying conditions for the first portion of the drying to prevent moisture collecting at the surface of the pebble causing fusing and case hardening of the surface of the pebble. Extremely long final drying times are then required to remove the remaining moisture.

The vigorous drying conditions provided in our single drying step, on the other hand, not only do not produce case hardening, but also do not result in disintegration of the granular pebbles, and thus effect rapid water removal, thus shortening the drying time, and providing a cooler end product.

The product produced in our drying operation is a spherical pebble of bulk density in the range of about 0.80 to about 0.86, which is relatively strong and crush resistant so as to resist disintegration on shipping and handling, thus being adapted for use as fertilizer, and is sufficiently porous so as to be adapted for explosive use, and to absorb sufficiently large quantities of hydrocarbon oil as to provide adequate detonation under conditions prevailing in the art for the use of such compositions.

The following specific examples further illustrate our invention. Parts are by weight except as otherwise noted.

*Example 1*

Molten ammonium nitrate of about 95.5% concentration (containing about 4.5% water) at about 145–155° C. was pebbled from shotting nozzles into a countercurrent stream of air at 10° C. wherein pebbles were formed and cooled to 81° C. and reduced to a water content of 3.9%. These pebbles were immediately placed in stationary vertical drums open at the top, wherein they were held quiescent for about 30 minutes during which time the temperature of the pebbles declined to 75° C. Air in contact with the pebbles during storage had a partial pressure of water of about 100 mm. Hg, so that substantially no change in moisture content of the pebbles took place in storage. Water content of the pebbles after storage was 3.9%, that is, substantially the same as upon entering the storage drums. The pebbles were then fed into a rotary drier and drying air at about 140° C. was forced through the drier countercurrent to the pebbles. After 29 minutes in the drier the temperature of the pebbles was about 65° C., their water content was less than 0.3%. The pebbles were thus ready for bagging and storage without further treatment.

*Example 2*

Ammonium nitrate was pebbled as described in Example 1 above, and pebbles were taken from the pebbling tower at a temperature of about 84° C. and a water content of 3.3%. The pebbles were placed in a rotating cylinder with showering flights, and held therein for a period of 100 minutes during which time the temperature ranged from 84° C. to about 70° C. Thereafter the pebbles were fed into a rotary drier in which air at about 150° C. was flowing countercurrent to the flow of pebbles. In about 55 minutes in the drier under these conditions, the water content of the pebbles had dropped to less than 0.3% and the temperature of the pebbled product was slightly less than 70° C. thus affording a product ready for bagging and storage without further cooling.

*Example 3*

To illustrate the importance of the storage period, ammonium nitrate pebbles produced as described in Example 1, were taken from the pebbling tower at about 90° C. and a water content of 3.2% and charged to a rotating drier over a five-minute period. Drying air at 140° C. was forced through the drier countercurrent to the pebbles. After remaining in the drier for 148 minutes under the above conditions, the product pebbles had a water content of 0.93% and a temperature of 84° C., so that additional cooling and drying would be required to produce a product ready for bagging and storage.

*Example 4*

Ammonium nitrate pebbles prepared as described in Example 1 above, are mixed with diesel oil by spraying the oil on the ammonium nitrate in a rotary mixer, and completely absorb up to 5.5% oil producing free-flowing, apparent essentially dry pebbles. A sample of this oiled ammonium nitrate placed in a polyethylene bag and detonated at ground level with 6 inches of 50 grain "prima cord" detonating cord set off by a No. 6 blasting cap produces a crater 34 inches in diameter and 10¼ inches deep as a result of the explosion. This size crater indicates a high order explosion. A repetition of the above detonation tests using the same ammonium nitrate product after crushing the pebbles, results in the same order of detonation. This is surprising since it was to be expected that the crushed product would produce a higher detonation since pebbles produced by normal prior art drying procedures produce higher detonation in the above test when crushed than when not crushed. These facts indicate that by the drying steps of our invention, substantially maximum detonation potential is developed without destruction of the granular character of the pebbled mass.

While the above describes the preferred embodiments of our invention, it will be understood that departures therefrom may be made within the scope of the specification and claims.

We claim:

1. In a process for drying ammonium nitrate pebbles produced by spraying molten aqueous ammonium nitrate containing between about 3% and about 6% of water into the top of an elongated vertical pebbling tower, thereby forming droplets of ammonium nitrate, the steps which comprise, (1) cooling said droplets without substantial drying thereof, to temperatures within the range between about 60° C. and about 84° C., whereby solid ammonium nitrate pebbles are produced, (2) maintaining said pebbles under non-drying conditions at temperatures between about 60° C. and about 84° C. for a period sufficient to convert substantially all the ammonium nitrate of the pebbles to form III, (3) contacting said pebbles in a drier with a countercurrent stream of inert gas entering at temperatures between about 120° C. and about 150° C., for a period sufficient to reduce the water content of the pebbles to not more than about 0.3%.

2. In a process for drying ammonnum nitrite pebbles produced by spraying molten aqueous ammonium nitrate containing between about 3% and about 6% of water, into the top of an elongated vertical pebbling tower countercurrent to an ascending stream of air, thereby forming droplets of ammonium nitrate, the steps which comprise (1) cooling said droplets without substantial drying thereof to temperatures within the range between about 60° C. and about 84° C. whereby solid ammonium nitrate pebbles are produced, (2) maintaining said pebbles at temperatures between about 60° C. and about 84° C. while inhibiting air circulation within the mass of said pebbles, for a period sufficient to convert substantially all the ammonium nitrate of the pebbles to form III, (3) contacting said pebbles in a rotary drier with a countercurrent stream of air entering at temperatures between about 120° C. and about 150° C. for a period sufficient to reduce the water content of the pebbles to not more than 0.3% and their temperature to not more than 70° C.

3. A process for drying ammonium nitrate which comprises (1) spraying molten aqueous ammonium nitrate containing between about 3% and about 6% of water into the top of an elongated vertical pebbling tower thereby forming droplets of ammonium nitrate, (2) cooling said droplets in said tower to a temperature within the range between about 60° C. and about 84° C. without substantial drying to form solid ammonium nitrate pebbles having a water content not more than about 0.5% less than the molten ammonium nitrate, (3) maintaining said pebbles under non-drying conditions at temperatures between about 60° C. and about 84° C. for a period between about 20 minutes and about 120 minutes, (4) contacting said pebbles in a rotary drier with a stream of air entering at temperatures between about 120° C. and about 150° C. for a period of not more than about an hour, whereby cool dry pebbles are produced having a temperature not higher than about 70° C. and a water content not greater than 0.3%.

References Cited in the file of this patent

UNITED STATES PATENTS

| | | |
|---|---|---|
| 2,402,192 | Williams et al. | June 18, 1946 |
| 2,782,108 | Antle | Feb. 19, 1957 |